United States Patent [19]
Brettner, III

[11] Patent Number: 5,914,684
[45] Date of Patent: Jun. 22, 1999

[54] ELECTROMAGNETIC TRANSDUCER SYSTEM WITH INTEGRATED CIRCUIT CARD ADAPTER

[75] Inventor: William Howard Brettner, III, Glendale, Ariz.

[73] Assignee: Honeywell Inc., Minneapolis, Minn.

[21] Appl. No.: 08/844,148

[22] Filed: Apr. 18, 1997

[51] Int. Cl.⁶ .................................................. G01S 13/00
[52] U.S. Cl. ............................. 342/175; 342/153; 342/26
[58] Field of Search ............................ 342/26, 175, 153; 455/80, 81, 328; 333/157

[56] References Cited

U.S. PATENT DOCUMENTS 4,777,654  10/1988  Conti .......................................... 455/81

*Primary Examiner*—Daniel T. Pihulic
*Attorney, Agent, or Firm*—Snell & Wilmer LLP

[57] ABSTRACT

An apparatus according to various aspects of the present invention is configured to collect and/or emit electromagnetic waves, particularly microwaves. In one embodiment, a transducer system includes an integrated waveguide, transducer, and processing circuit. The processing circuit is disposed between two plates which also serve to define the waveguide. The transducer, such as an E-field probe, is disposed in the waveguide to collect or emit electromagnetic waves such as microwaves. The transducer is directly connected to the processing circuit within the integrated unit.

19 Claims, 3 Drawing Sheets

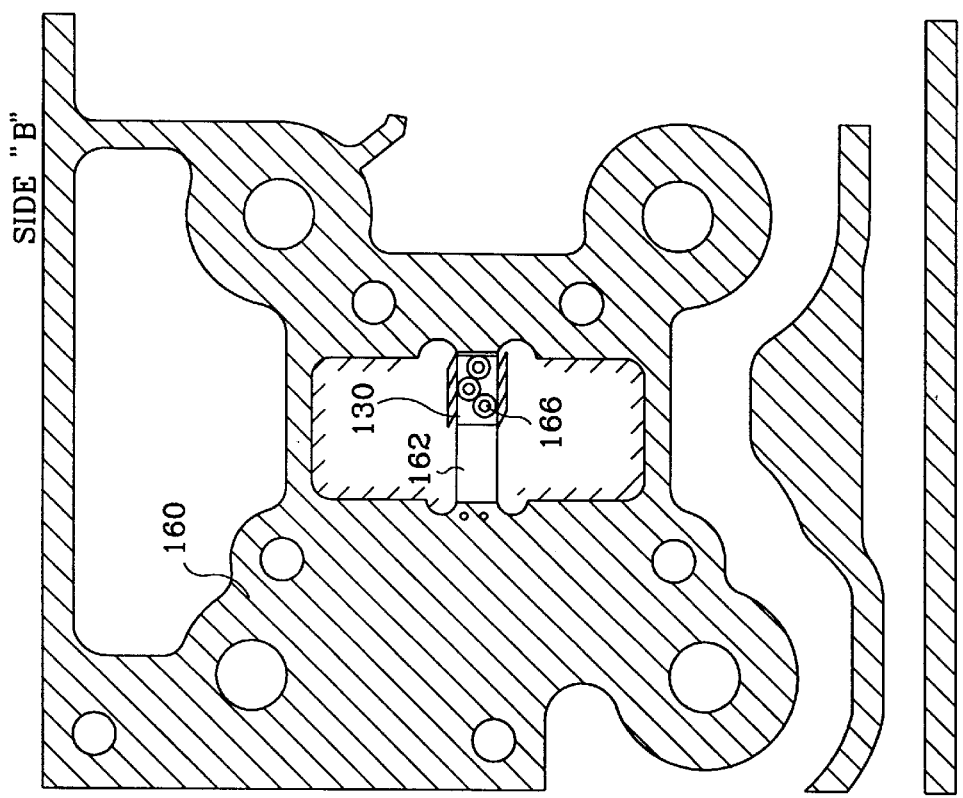
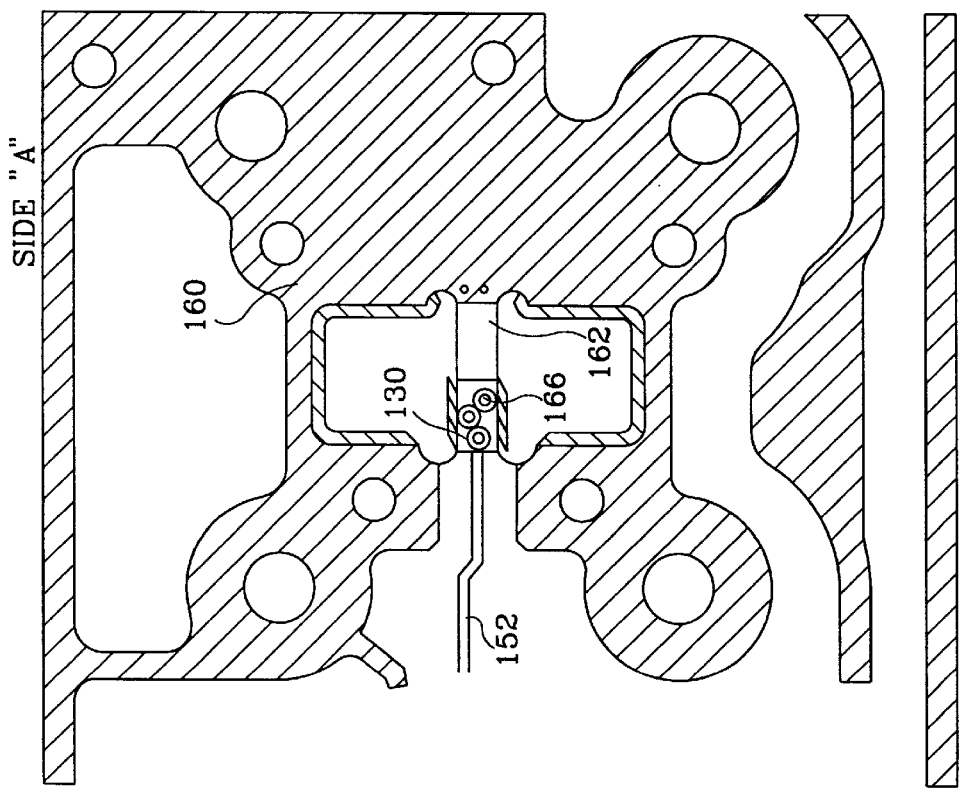
Fig. 3B
Fig. 3A

ELECTROMAGNETIC TRANSDUCER SYSTEM WITH INTEGRATED CIRCUIT CARD ADAPTER

BACKGROUND OF THE INVENTION

1. Field of the Invention

The invention relates to electromagnetic transmission and detection, and more particularly, to waveguides and sensors for electromagnetic wave transmission and reception.

2. Description of the Related Art

Microwave technology has long been known to be useful in telecommunications and radar systems. With the proliferation of low-cost microwave semiconductor technology, however, old applications are being revisited to take advantage of the advances and new applications are being developed. In telecommunications, microwaves carry information, such as for telephone and television systems. Microwaves, which have a higher frequency than ordinary radio waves, can carry more information. In addition, because of their high frequency, microwaves can be accurately focused in a narrow beam from a transmitting antenna to a receiving antenna. Similarly, the high frequency of microwaves makes them suitable for focused radar applications.

Microwaves, like other electromagnetic radiation, may propagate through space, but may also be directed or guided. Microwaves are typically generated by an emitter and coupled to a waveguide, and are similarly received by a sensor, such as an E-field probe, coupled to a waveguide. The received signals are then directed to appropriate instruments for further processing.

Conventionally, signals corresponding to microwaves are transmitted to and from the processing circuitry via a coaxial cable system, which is connected to an assembly which matches the wave to the waveguide mode and impedance. For example, referring to FIG. 4, microwave energy is collected (or excited) in a conventional launch by an electric field (E-field) coupling probe (or emitter) 400 disposed in a waveguide 402 (or resonator), such as a circular or rectangular waveguide. The E-field probe 400 or emitter is attached to a coaxial connector 404. A non-waveguide coaxial cable is then suitably connected to the connector 404 to transmit the signals to and from the processing circuitry. Thus, the launch is configured to provide a transition between the waveguide 402 and other transmission systems.

Preferably, the launch matches the waveguide's 402 wave orientation, field type, mode, and impedance to and from the processing circuit. The probe 400 exchanges energy between the transmission line and the waveguide 402. The E-field probe 400 is typically configured as a linear, open-ended antenna which is positioned near the maximum magnitude of the electric field in the waveguide 404 and oriented so that its length is parallel to the electric field vector in the waveguide 402. Properly configured, the launch may minimize the RF power loss and maximize the power delivered to and from the processing circuit.

Although this configuration may be effective in some applications, the assembly includes several inherent drawbacks. For example, the configuration is costly, partly due to the number of components and the close tolerances for properly assembling the launch and waveguide. In addition, conventional launches or adapters require intermediate connection between the waveguide and the processing circuit. Consequently, additional connectors and cable are necessary to transmit or receive signals in conjunction with an actual processing circuit, such as a microstrip circuit board. These components not only add cost, but tend to degrade the performance and reliability of the launch.

SUMMARY OF THE INVENTION

An electromagnetic transducer system according to various aspects of the present invention includes an integrated waveguide or resonator, transducer, and processing circuitry. The transducer is disposed in the waveguide/resonator to detect or transmit electromagnetic waves, such as microwaves. The transducer is directly connected to the processing circuit within the integrated unit.

Accordingly, an electromagnetic transducer system according to various aspects of the present invention does not suffer many of the disadvantages associated with conventional systems. The integration of the components tends to reduce the cost and size of the assembly, as several components of the conventional assembly are eliminated from the present configuration. In addition, the present system provides improved performance by eliminating components which tend to degrade the performance and reliability of the system. The present system further provides for simpler manufacturing and reliability.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

Figure 4:
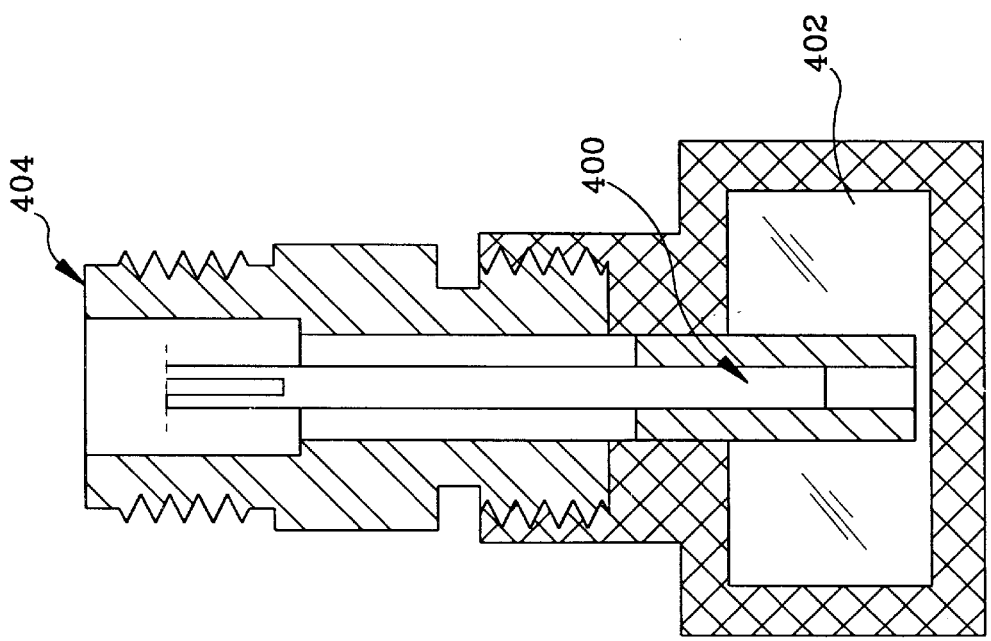

FIGS. 3A–B are detailed elevational views of the back and front faces of the central section, respectively; and FIG. 4 is a cross-sectional view of a prior art waveguide and launch.

DETAILED DESCRIPTION OF PREFERRED EXEMPLARY EMBODIMENTS

Figure 1:
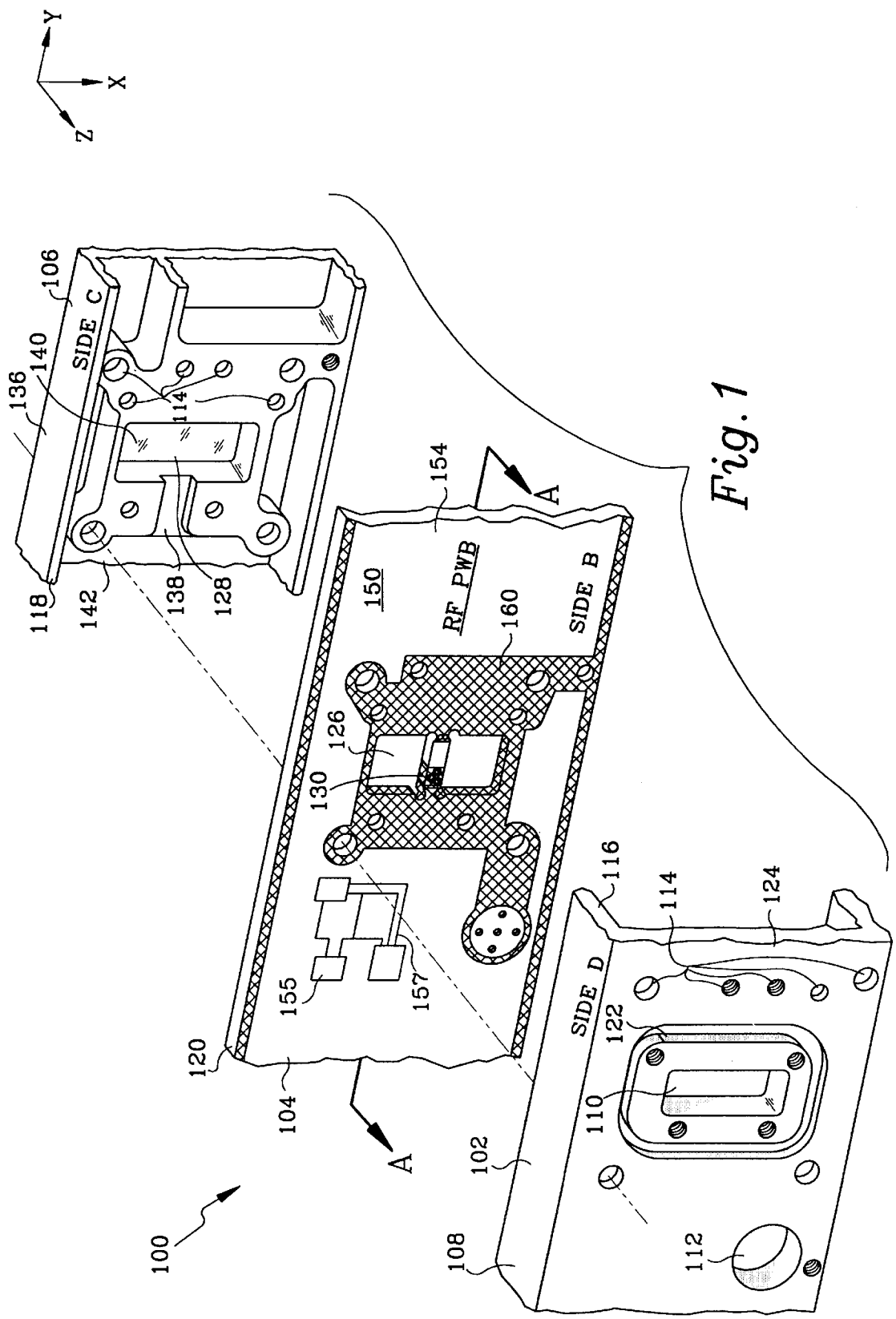
FIG. 1 is an exploded view of an electromagnetic transducer system according to various aspects of the present invention.

Referring now to FIG. 1, an electromagnetic wave transducer system 100 is suitably configured for exciting and/or collecting electromagnetic waves, particularly microwave radiation. For example, a microwave receiver according to various aspects of the present invention may be configured for use in conjunction with an airborne weather radar system. In general, a transducer system according to various aspects of the present invention suitably comprises: a front plate 102; a back plate 106; and a central section 104 disposed between the front plate 102 and the back plate 106. The central section 104 is suitably sandwiched or enclosed between the front plate 102 and the back plate 106. The front plate 102, central section 104, and back plate 106 are suitably assembled into a single unit, for example using fasteners, such as bolts (not shown), passed through axially aligned apertures formed through the various components.

The transducer system 100 of the present embodiment is configured as a receiver, for example for use in conjunction with a weather radar system. It should be noted, however, that the present embodiment is provided solely for illustrative purposes, and that various aspects and principles used in accordance with the present embodiment may be applied to other configurations, such as transmitters, resonators, and the like.

The front plate 102 suitably forms a portion of a waveguide or resonator for transmitting electromagnetic waves. The front plate 102 preferably provides physical and high frequency electromagnetic shielding for the central section 104. For example, the front plate 102 suitably includes a body portion 108 having a first waveguide aperture 110; at least one connection aperture 112; and a plurality of fastener apertures 114. The body portion 108 is suitably comprised of an electromagnetically reflective material, such as aluminum, to shield the central section 104 from electromagnetic interference. Alternatively, the front plate 102 may be made of, for example, brass or copper, and may be plated, suitably with an electromagnetically reflective material such as cadmium, nickel, gold, or silver.

The body portion 108 is suitably configured to conform to the shape and size of the central section 104. For example, the front plate 102 may be slightly larger than the central section 104 and include a peripheral rim 116. The rim 116 of the front plate 102 suitably mates with a rim 118 of the back plate 106 to enclose the central section 104 within a cavity formed between the front plate 102 and the back plate 106. Alternatively, the rim 116 of the front plate 102 suitably engages an outer perimeter 120 of the central section 104 so that the outer perimeter 120 of the central section 104 is sandwiched between the rim 116 of the front plate 102 and a corresponding rim 118 of the back plate 106. The front plate 102 may be created and formed in any suitable manner, such as by casting, machining, or forming.

To transmit waves into the transducer system 100, the first waveguide aperture 110 is suitably formed through the front plate 102. The first waveguide aperture 110 is suitably configured to transmit waves of a selected mode and within a selected range of frequencies toward the central section 104. For example, to transmit $TE_{10}$ signals having a center frequency of 9.5 GHz, the first waveguide aperture 110 suitably has a length of 0.9 inches and a width of 0.4 inches.

The first waveguide aperture 110 is suitably surrounded by a groove 122 formed in the front face 124 of the front plate 102 opposite the central section 104. The groove 122 is suitably configured to receive an additional waveguide or other attachment fixed to the front face of the front plate 102. For example, a resilient weather sealing gasket may be seated in the groove 122 and fixed between an external waveguide and the transducer system 100.

As is described below, the first waveguide aperture 110, a second waveguide aperture 126 associated with the central section, and the back plate waveguide cavity 128 cooperate to define at least a portion of a waveguide or resonator in which a transducer 130 is disposed. In the present embodiment, the waveguide is configured as a sensor for the dominant ($TE_{10}$) rectangular waveguide mode. It should be noted, however, that the waveguide is not confined to the configuration shown and discussed, but may suitably comprise any sort of waveguide, conventional or otherwise, for directing or controlling the propagation of the relevant waves. For example, the waveguide suitably comprises a rectangular waveguide as shown, or alternatively, may comprise a circular waveguide. The configuration, size, and shape of the waveguide may be adjusted according to the particular application and to accommodate the desired wavelength and mode of the relevant signal.

The connection aperture 112 suitably provides access to electrical connections within the interior of the transducer system 100, such as connectors mounted on the central section 104, for example to read or provide data or apply power to the system 100. For example, a transducer system 100 according to various aspects of the present invention includes at least two connection apertures 112 including an SMA interface aperture 112 and a multiprong connector aperture (not shown). The SMA interface aperture 112 suitably provides access to an SMA connector mounted on the central section 104 of the transducer system 100, such as for transferring raw data from the system 100 to external devices. Similarly, the multiprong connector aperture provides access to a multiprong connector connected to the central section 104. Any suitable number of connection apertures 112 may be formed in the front plate 102 to facilitate access to the interior of the transducer system 100. Alteratively, other connection mechanisms, such as through the back plate 106, along the side of the central section 104, through the rim of the front plate 102 or back plate 106, and the like may be provided as desired.

The back side of the front plate 102 (i.e., the side of the front plate 102 facing the central section 104) is suitably contoured to accommodate components or other variations in a front face of the central section 104. Portions of the front plate 102 accommodating fastener apertures 114, however, are suitably substantially flush with the rim of the front plate 102 to provide support for the fasteners and electrical connections between the front plate 102, central section 104, and back plate 106 where desired. In addition, the fastener apertures 114 are suitably lined with a conductive material.

The back side of the front plate 102 also suitably includes at least two mating pin cavities (not shown) for receiving mating pins. As described below, the mating pins protrude from the front side of the back plate 106, through the mating pin apertures in the central section 104, and into the mating pin cavities. Alignment of the mating pins into the appropriate holes and cavities assures proper assembly and alignment of the front plate 102, back plate 106, and central section 104.

The back plate 106 suitably includes a body portion 136 having a waveguide cavity 128, a plurality of fastener apertures 114, and a transducer connection channel 138. The back plate body portion 136 is suitably comprised of an electromagnetically reflective material, such as aluminum, to shield the central section 104 from high frequency electromagnetic interference. The body portion 136 is also suitably configured to conform to the shape and size of the central section 104 and the front plate 102. For example, like the front plate 102, the back plate 106 may be slightly larger than the central section 104 and include a peripheral rim 118. The rim 118 of the back plate 106 suitably mates with the rim 116 of the front plate 102 to enclose the central section 104 between the front plate 102 and the back plate 106. Alternatively, the rim 118 of the back plate 106 suitably engages an outer perimeter 120 of the central section 104 so that the outer perimeter 120 of the central section 104 is sandwiched between the rim 116 of the front plate 102 and the rim 118 of the back plate 106. The back plate 106 may be created in any suitable manner, such as by casting, machining, or forming.

The back surface of the back plate 106 may include a series of vanes (not shown), for example integrally formed into the back surface. Such vanes are suitably configured to operate as a heat sink to transfer heat away from the central section 104 during operation.

The waveguide cavity 128 is suitably configured to transmit waves of a selected frequency through the first waveguide aperture 110, past the central section 104, and to a rear wall 140 of the cavity. The remaining walls of the waveguide cavity 128 are preferably coplanar with the walls defining the first waveguide aperture 110. The rear wall 140 of the waveguide cavity 128, on the other hand, is preferably configured to reflect a maximum amount of the electromagnetic energy back into the waveguide cavity 128 and to the transducer 130. For example, the rear wall 140 of the waveguide cavity 128 is suitably comprised of or coated with an electromagnetically reflective material to reflect incident electromagnetic energy. In the present embodiment, the waveguide cavity 128 is configured to have a depth of one quarter of the wavelength of the relevant waves to generate constructive interference and maximize the amplitude of the field at the transducer 130. For optimum efficiency, the depth should be within 5–10 mils of the desired depth for a transducer system configured for an approximately 10 GHz frequency. As the relevant frequency increases, the tolerances of the depth of the waveguide cavity 128 become more restrictive.

The front side 142 of the back plate 106 (i.e., the side of the back plate 106 facing the central section 104) is suitably contoured to accommodate components or other variations in a back face of the central section 104. Portions of the back plate 106 accommodating fastener apertures 114, however, are suitably flush with the rim 118 of the back plate 106 to provide support for the fasteners and electrical connections between the front plate 102, central section 104, and back plate 106 where desired. In addition, the fastener apertures 114 are suitably lined with conductive material. The front side 142 of the back plate 106 suitably includes at least two mating pins (not shown) to assure the proper alignment of the back plate 106 with the front plate 102 and central section 104. The mating pins are suitably rigidly formed in the material of the back plate 106.

The transducer connection channel 138 is suitably formed in a portion of the front face 142 of the back plate 106 adjacent the waveguide cavity 128. In particular, the transducer connection channel 138 is configured to provide a cavity between the front face 142 of the back plate 106 and the back face of the central section 104 through which a transducer disposed in the waveguide may be connected to other components, such as on a printed wiring board included in the central section 104 as described below. It should be noted that the transducer connection channel 138 may alternatively be formed on the back face of the front plate 102, or on either face of the central section 104. In addition, the transducer connection channel 138 may be enclosed, for example by a strip of insulative material or the like, to create a transducer connection "tunnel". Regardless of its configuration or location, the transducer connection channel 138 provides a route through which a transducer 130 in the waveguide may be connected to components relatively remote from the waveguide without electrically contacting the front plate 102, back plate 106, or other grounded or otherwise inappropriate parts of the transducer system 100.

Figure 2:
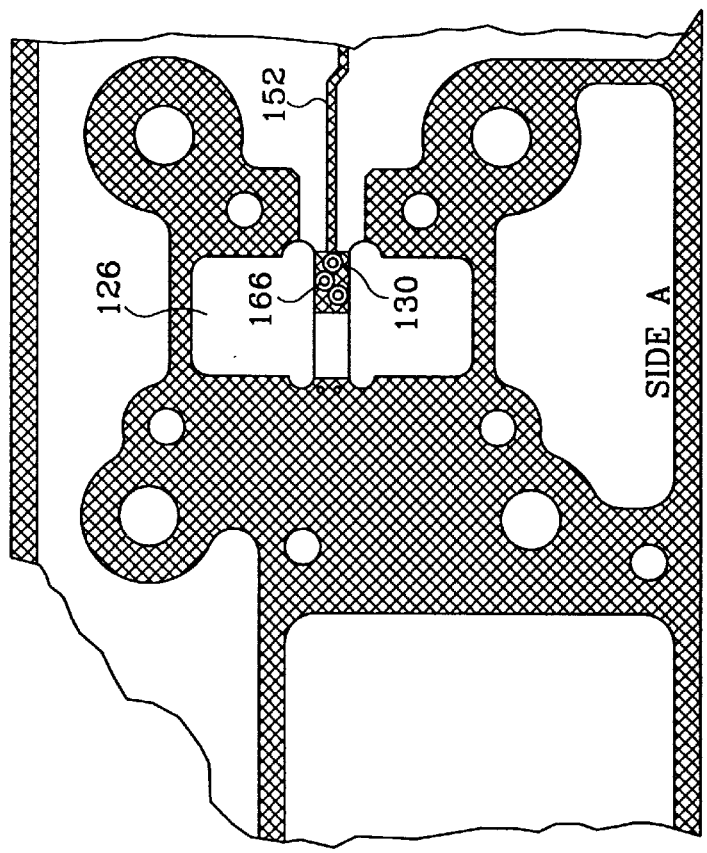
FIG. 2 is an elevational view of the back face of the central section.

Referring now to FIGS. 1 and 2, the central section 104 suitably includes a central board 150, a second waveguide aperture 126, a transducer 130, a circuitry interface 152. The central board 150 is suitably formed according to the size, shape, and configuration of the front plate 102 and the back plate 106. The depth of the central board 150 may be varied according to the density and amount of circuitry to be placed on and within the printed wiring board, as described below.

The central board 150 of the present transducer system 100 according to various aspects of the present invention includes a conventional printed wiring board 154, for example a laminated or monolithic wiring board for use in conjunction with microstrip wiring, of substantially identical width and length as the front plate 102 and back plate 106. The central board 150 suitably includes a plurality of fastener apertures 114 and mating pin apertures (not shown). The fastener apertures 114 suitably correspond to the fastener apertures 114 formed in the front plate 102 and back plate 106, and are configured to received bolts or an analogous fastening mechanism to fix the components together into a single unit. Similarly, the mating pin apertures are suitably configured to correspond to the mating pins protruding from the front face of the back plate 106. The mating pins suitably pass through the apertures and are received in the mating pin cavities defined in the back surface of the front plate 102.

The second waveguide aperture 126 is suitably formed through the central board 150. The second waveguide aperture 126 suitably corresponds to the first waveguide aperture 110 of the front plate 102 and the waveguide cavity 128 of the back plate 106 such that the edges of the second waveguide aperture 126 are coplanar with the corresponding walls of the first waveguide aperture 110 and the back plate waveguide cavity 128.

The printed wiring board 154 is suitably configured to receive a plurality of discrete components 155 mounted on one or both of its faces. The printed wiring board 154 is suitably constructed according to techniques, materials, and structures disclosed in U.S. Pat. No. 5,311,406. In addition, the printed wiring board 154 is configured to include a plurality of conductive connections 157 routed between the various components 155 on the surfaces of the printed wiring board 154 and among the various layers in between the two exposed faces of the printed wiring board 154. The connections 157 are suitably formed in accordance with conventional techniques, such as those associated with microstrip routing. Thus, the pattern of the routing and coverage of the conductor material on the surface of the printed wiring board 154 is controlled, for example, by the mask artwork used to define the pattern on the printed wiring board 154.

In addition to the wiring 157 connecting the various components 155, the central section 104 further suitably includes a flange 160 formed around the perimeter of the second waveguide aperture 126 to form an electrical contact with the front plate 102 and the back plate 106. The flange 160 is suitably formed of an electrically conductive material, such as aluminum or copper. For example, the flange 160 may be formed using the same method and materials for defining the connections 157 on the printed wiring board 154. The flange 160 further suitably extends over a portion of the printed wiring board 154, for example to surround and line the fastener apertures 114 formed in the central board 150. The flange 160 suitably is formed on both faces of the central board 150.

In addition, the fastener apertures 114 and mating pin apertures are similarly surrounded and lined with conductive material. The conductive material surrounding and lining the fastener apertures 114, mating pin apertures, and the second waveguide aperture 126 are suitably connected together, for example via wiring printed on the printed wiring board 154. Also, both sides of the electrical conductor of the flange 160 are connected with a wrap around conductor extending around the circumference of the second waveguide aperture 126. The flange 160 is further suitably configured to contact the portions of the back face of the front plate 102 that are flush with the rim 116 of the front plate 102, and similarly, with the portions of the front face of the back plate 106 that are flush with the rim 118 of the back plate 106. Consequently, the front plate 102, back plate 106, the flange 160, and the fasteners apertures 114 are all suitably connected to a single electrical potential.

The transducer 130 is suitably configured in the present embodiment to sense electromagnetic waves traveling in the second waveguide aperture 126 and waveguide cavity 128 and generate corresponding electrical signals, which are suitably transmitted to components 155 mounted on the printed wiring board 154. Alternatively, the transducer 130 may be configured as an emitter to generate electromagnetic waves in response to electric signals and transmit them via the waveguide. The transducer 130 is suitably connected to the components 155 on the printed wiring board 154 to provide or receive signals.

In the present embodiment, the transducer 130 comprises an E-field probe configured to detect E-field signals of electromagnetic waves traveling through the waveguide. The transducer 130 is suitably disposed in the second waveguide aperture 126 or waveguide cavity 128. Preferably, the transducer 130 is positioned about a quarter of a wavelength away from the rear wall of the waveguide cavity 128 to maximize the constructive interference effects of signals reflecting from the rear wall towards the transducer 130. For example, for microwave frequencies of 9.5 GHz, the transducer 130 is suitably positioned about 205 mils from the rear wall of the waveguide cavity 128.

For example, the transducer 130 suitably comprises a conductive material disposed on, around, or in a cross member 162 extending across the second waveguide aperture 126 formed in the central board 150. For example, the conductive material may be formed on the cross member 162 using the same process for generating the connections 157 and the flange 160 on the printed wiring board. Referring now to FIGS. 3A–B, to create a transducer 130, the conductive material is disposed on the cross member 162. A portion of the conductive material is removed from the area between the transducer 130 and the flange 160 and the edge of the second waveguide aperture 126 to electrically isolate the transducer 130 from the flange 160 material surrounding the perimeter of the second waveguide aperture 126.

In one embodiment, the transducer 130 is suitably formed only on one side of the cross member. To increase the bandwidth of the transducer 130, however, the transducer may be thickened. For example, to provide greater thickness to the transducer 130, conductive material may be wrapped around the cross member 162 so that the conductive material encircles a portion of the cross member 162. For example, conductive material may be wrapped around the cross member by plating after an etching process. In addition, the conductive material is removed from the remaining part of the cross member 162 from which the transducer 130 is absent. Further, the transducer 130 suitably includes a plurality of small, plated-through holes 166 to reduce the effects of radial currents induced in the transducer 130 by the electromagnetic waves.

It should be noted that it is possible to locate the cross member 162 and the transducer 130 on the front plate 102 or the back plate 106. In the present embodiment, the cross member 162 is comprised of the same material as the printed wiring board 154. In particular, the second waveguide aperture 126 according to various aspects of the present invention suitably comprises two separate apertures, separated by the cross member 162.

It should be noted that although the present embodiment illustrates only one potential configuration of the transducer 130, the transducer 130 may be positioned or formed in any manner. For example, the cross member 162 may be replaced with a single protrusion from the side of the second waveguide aperture 126 on which the transducer 130 is formed. In addition, the transducer 130 suitably comprises a solid metal transducer 130 or other type of probe. The orientation and position of the transducer 130 may also be adjusted according to the desired mode or other characteristics of the electromagnetic waves or the system 100. Also, multiple transducers 130 may be provided for sensing multiple wavelengths or higher order modes.

By mounting the transducer 130 on the cross member, the lateral position of the transducer with respect to the wave propagation direction is determined according to the process used to create the transducer 130, such as a conventional circuit printing process. Because such techniques are typically highly precise, the position of the transducer 130 may be selected with great precision. Further, the position of the transducer 130 with respect to the rear wall of the waveguide cavity 128 is determined according to the depth of the waveguide cavity 128. Modern machining tools are capable of easily providing a precise depth of the waveguide cavity 128. Consequently, the position of the transducer 130 in the waveguide cavity may be easily fixed with high accuracy and precision.

The transducer 130 is suitably connected to the components 155 of the printed wiring board 154 via the circuitry interface 152, such as an electrical connection, formed on one of the faces of the central board 150 and through the transducer connection channel 138. In particular, the flange 160 material is suitably removed from the central board 150 in an area adjacent the transducer 130 and cross member 162. The printed wiring on the printed wiring board 154 suitably includes an electrically conductive connection 152 along the transducer connection channel 138 between the transducer 130 and the relevant components 155 and through the area from which the flange 160 material is removed. Consequently, the transducer 130 may be connected to the relevant components without electrically contacting the flange 160, the front plate 102, or the back plate 106. In addition, the connector 152 may be selected to match the impedance of the relevant components 155.

The front plate 102, central section 104, and back plate 106 are suitably fastened together to form a single unit. For example, a bolt may be received through each of said fastener apertures 114 formed in the front plate 102, central section 104, and back plate 106. The fastener apertures 114 are suitably threaded to engage threads formed on the bolts. Alternatively, the bolt threads suitably engage corresponding nuts on the opposite side of the transducer system 100, for example on the back face of the back plate 106. The bolts may be electrically conductive to further maintain electrical communication between the front plate 102, back plate 106, and grounded portions of the central section 104.

In operation, the transducer system 100 according to the present embodiment emits or collects electromagnetic waves (or components of electromagnetic waves) and transmits corresponding signals to or from the electrical components on the printed wiring board 154. As electromagnetic waves propagate towards the front plate 102 of the system 100, a portion of the wave enters the first waveguide aperture 110 of the front plate 102 and propagates past the transducer 130 disposed in the second waveguide aperture 126 of the central board 150. As the waves intercept the transducer 130, current is generated in the transducer 130, which creates a voltage in the transducer connector 152. The voltage is suitably sensed by the electrical components and processed conventionally. Meanwhile, portions of the electromagnetic waves that do not enter the first waveguide aperture 110 are reflected by the front plate 102 and back plate 106, thus reducing electrical interference.

Thus, an electromagnetic transducer system 100 according to various aspects of the present invention may comprise a more cost effective and reliable transducer system having improved performance. In particular, a transducer system 100 according to various aspects of the present invention may be manufactured using industry standard processes without the need for specialized machinery or tools. In addition, factory adjustments are not required. The location of the transducer element 130 with respect to the rear wall of the waveguide cavity is easily maintained by properly machining the back plate 106, and the lateral position of the transducer 130 element is determined according to the artwork used in the printing process.

Further, the absence of the coaxial connections required by the prior art further reduce the size of the transducer system 100, which is crucial in many applications such as avionics. Also, increasing the thickness of the transducer, for example by wrapping conductor around the cross member, provides superior bandwidth to the transducer 130.

While the principles of the invention have now been made clear in illustrative embodiments, it will be immediately obvious to many skilled in the art that many modifications of structure, arrangements, proportions, the elements, materials and components, used in the practice of the invention which are particularly adapted for a specific environment and operating requirements may be made without departing from those principles.

I claim:

1. An electromagnetic transducer system, comprising:
   a body portion having a first aperture for receiving an electromagnetic wave;
   a central board substantially enclosed within said body portion, said central board having a second aperture that is aligned with said first aperture of said body portion, said first aperture of said body portion and said second aperture of said central board forming at least a portion of a waveguide; and
   a transducer mounted on a cross member contained at least partially within said second aperture such that said transducer is positioned within said waveguide to intercept said electromagnetic wave.

2. The electromagnetic transducer system of claim 1, wherein said transducer is formed at least in part with a conductive material disposed on said cross member.

3. The electromagnetic transducer system of claim 1, wherein said transducer is formed at least in part with a conductive material that is wrapped around said cross member so that said cross member is encircled by said conductive material.

4. The electromagnetic transducer system of claim 1 further comprising a cavity cooperating with said first aperture and said second aperture to form at least a portion of said waveguide, said cavity having a rear wall disposed one quarter wavelength from said transducer.

5. The electromagnetic transducer system of claim 1 further comprising a circuit interface between said transducer and a printed circuit having a conductive material disposed on a printed circuit substrate and electrically isolated from said body portion.

6. The electromagnetic transducer system of claim 1 further comprising a conductive lining of said second aperture that is electrically connected to said body portion.

7. An electromagnetic transducer system, comprising:
   a front plate having a first aperture formed therethrough for receiving an electromagnetic wave traveling in a direction of propagation;
   a back plate having a cavity that is aligned with said first aperture in said direction of propagation;
   a central section having a second aperture, said central section being disposed between said front plate and said second plate such that said second waveguide aperture is aligned with said first aperture and said cavity in said direction of propagation, said first aperture, said second aperture and said cavity forming at least a portion of a waveguide, said central section further including:
   a printed circuit; and
   a transducer connected to said printed circuit and mounted on a cross member contained at least partially within said second aperture such that said transducer is positioned within said waveguide and disposed between said first aperture and said cavity.

8. The electromagnetic transducer system of claim 7, wherein said transducer is formed at least in part with a conductive material disposed on said cross member.

9. The electromagnetic transducer system of claim 1, wherein said transducer is formed at least in part with a conductive material that is wrapped around said cross member so that said cross member is encircled by said conductive material.

10. The electromagnetic transducer system of claim 7, wherein said transducer system is configured for a selected wavelength and disposed one quarter wavelength from a rear wall of said cavity.

11. The electromagnetic transducer system of claim 7 further comprising a circuit interface between said transducer and said printed circuit, said circuit interface including a conductive material disposed on said central section and electrically isolated from said front plate and said back plate.

12. The electromagnetic transducer system of claim 7, wherein said second aperture is lined with electrically conductive material.

13. The electromagnetic transducer system of claim 12, wherein said conductive material lining said second aperture is electrically connected to said front plate and said back plate.

14. A system for detecting a radar microwave, comprising:
   a body portion having a waveguide cavity formed therein;
   a printed wiring board substantially enclosed within said body portion, said printed wiring board having an aperture that is aligned with said waveguide cavity; and
   an electric field probe at least partially printed onto a cross member of said printed wiring board that is at least partially contained within said aperture such that said electric field probe is positioned within said waveguide cavity to detect the radar microwave.

15. The system of claim 14, wherein said electric field probe is formed at least in part with a conductive material disposed on said cross member.

16. The system of claim 14, wherein said transducer is formed at least in part with a conductive material is wrapped around said cross member so that said cross member is encircled by said conductive material.

17. The system of claim 14, wherein said system is configured for a selected wavelength and said electric field probe is disposed one quarter wavelength from an end of said waveguide cavity.

18. The system of claim 14 further comprising a circuit interface between said electric field probe and a printed circuit having a conductive material disposed on said printed wiring board and electrically isolated from said body portion.

19. The system of claim 14, wherein said aperture is lined with an electrically conductive material.

* * * * *